Inventor
Fred W. Rohr
By Hume, Clement, Hume & Lee
Attorneys

United States Patent Office 3,619,983
Patented Nov. 16, 1971

3,619,983
SUPPRESSION OF THE STEAM PLUME FROM INCINERATOR STACKS
Fred W. Rohr, Western Springs, Ill., assignor to
P & W Engineers, Inc., Chicago, Ill.
Filed Nov. 26, 1968, Ser. No. 779,012
Int. Cl. B01d 47/00
U.S. Cl. 55—89                                    3 Claims

ABSTRACT OF THE DISCLOSURE

Methods and apparatus for treating heated gases to remove particulate matter therefrom and to suppress steam plume formation upon discharge of the gases to the atmosphere are disclosed. Specifically, the gases are directed through a first heat exchanger passageway to a conventional scrubber system whereat substantially all of the particulate matter is removed from the gases. The scrubber also functions to reduce the temperature of the gases substantially below their dew point for effectively dehydrating the gases by condensation of the water vapor carried thereby. The dehydrated, scrubbed and cooled gases are passed through a second passageway of the heat exchanger and are reheated by intimate thermal contact with the gases passing through the first passageway, the gases in the first passageway being proportionally cooled. The reheated gases are then discharged to the atmosphere. Other features are disclosed.

CROSS-REFERENCE TO RELATED APPLICATION

The present application discloses subject matter similar to that disclosed and claimed in a concurrently filed application Ser. No. 779,114 entitled "Methods and Apparatus for Treating Combustion Gases," and assigned to the same assignee as the present invention.

BACKGROUND OF THE INVENTION

The present invention relates generally to the processing or treatment of combustion gases. More particularly, the invention is directed to thermodynamic methods and systems for removing objectionable particulate matter from combustion gases and for concomitantly precluding formation of a steam plume upon discharge of the gases to the atmosphere.

Air pollution in recent years has become a problem of national imoprtance with substantial attention being focused on means and methods for eliminating or at least substantially alleviating the quantity of particulate matter emitted from the chimneys of industrial furnaces, municipal incinerators and the like. In those instances where conventional water scrubbing systems or similar air pollution control means are used in removing the particulate matter, a large quantity of moisture in the form of water vapor is introduced into the gases, this moisture being in addition to that inherently generated as a byproduct of the combustion process, released from the burning matter or produced by quenching of the burned residue. Condensation of this water vapor occurring upon contact of the combustion gases with the relatively cool ambient air often results in a visible steam plume emission from the chimney or stack of the system. Although such visible steam emissions may be comparatively free from contaminants or other particulate matter, there is a form of aesthetic pollution and objection to the system operation is still encountered because it continues to appear, to the laymen at least, that the harmful pollution has not been abated.

SUMMARY OF THE INVENTION

It is therefore a primary objective of the present invention to provide a combined system that both removes the particulate matter from the combustion gases and prevents formation of an objectionable stem plume upon discharge of the cleansed combustion gases to the atmosphere.

It is a further and more specific purposes of the invention to provide such combined systems wherein the apparatus and method steps for steam plume suppression and contaminant removal are intimately correlated with one another so that an optimum economy and efficiency of operation is obtained.

Accordingly, the present invention relates to apparatus for treating the combustion gases produced by the furnace means of a fuel combustion system. More particularly, the apparatus of the invention comprises air pollution control means, preferably constituting a conventional scrubber, adapted to introduce a fluid into the combustion gases for removing the patriculate matter therefrom. The scrubber is constructed and operated such that the temperature of the gases is lowered substantially below their dew point so as to effect a dehydration of the gases by condensation of the moisture carried thereby. A first passageway of a heat exchanger means precedes the scrubber means to effect a cooling of the combustion gases prior to their introduction to the scrubber means; the outlet of the scrubber means is returned through a second passageway of the heat exchanger means which is in intimate thermal contact with the first passageway thereby resulting in a desired reheating of the cleansed combustion gases prior to their discharge to the atmosphere through outlet means including a chimney stack or the like.

The method of the present invention contemplates precooling of the combustion gases to a predetermined temperature and scrubbing of the cooled combustion gases with a fluid to remove particulate matter therefrom. The gases are further cooled, preferably by continued scrubbing, to a temperature substantially below their dew point to effect a dehydration of the gases by condensation of the moisture carried thereby. The relatively cool, scrubbed and dehydrated combustion gases are then reheated to a predetermined temperature and discharged to the atmosphere.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
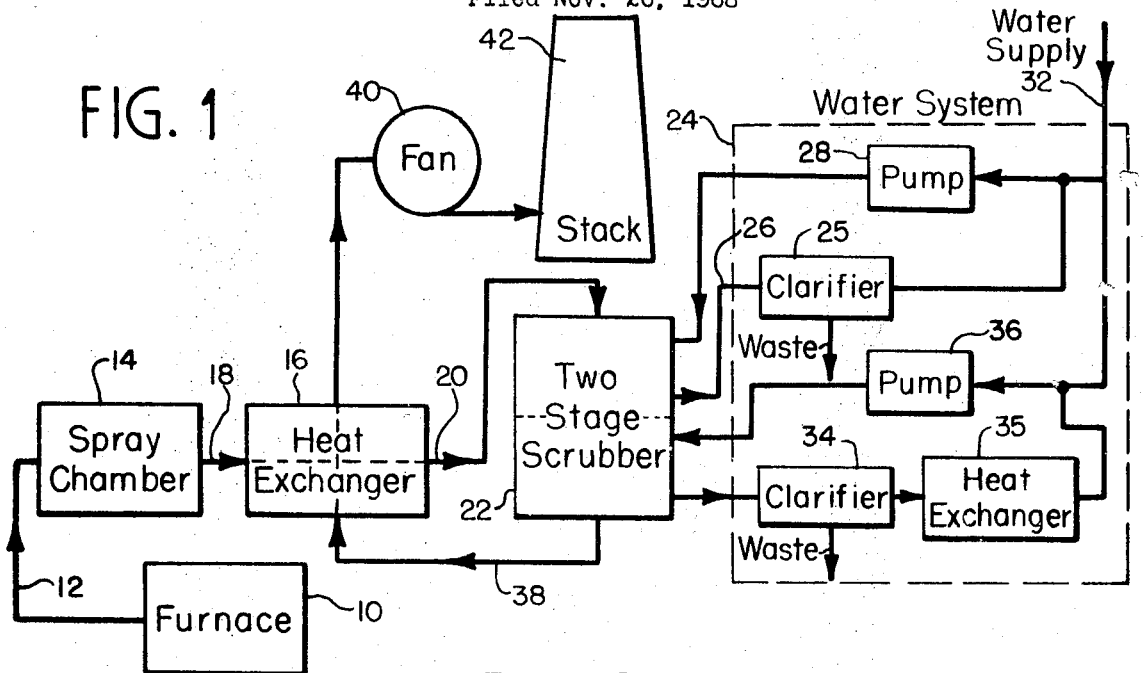
FIG. 1 is a schematic block diagram of a preferred embodiment of a fuel combustion system constructed in accordance with the teachings of the present invention.

Referring now to FIG. 1, the combustion system there illustrated comprises a furnace means 10 such as a conventional industrial processing furnace, municipal incinerator or the like. The intensely hot combustion gases developed within the furnace 10 carry a substantial quantity of particulate matter in the form of fly ash, soot and/or other objectionable contaminants, the specific character of which is, of course, determined by the type of matter being burned or oxidized and the combustion environment. The polluted gases are directed through a furnace outlet duct, schematically indicated in the drawing by the arrow 12, to a spray chamber 14. The spray chamber 14 may be of conventional design and operation providing a water spray through the gases to precool them to a temperature acceptable to the metallurgical standards of the succeeding heat exchanger means 16 and to remove some of the particulate matter in the combustion gases which may tend to clog the passageways of the heat exchanger. A substantial quantity of moisture is inevitably added to the gases during cooling in the spray chamber which is in addition to that added in the furnace as a generated by-product of the combustion process, released by the matter being burned or developed as a consequence of quenching of the burned residue. In certain circumstances, the gases may conveniently be cooled by addition of ambient air instead of by employment of a spray chamber in which case the humidity of the gases is not increased.

The heat exchanger means 16 comprises a first passageway depicted schematically by dashed lines in the drawing, interconnected in a flow path with an outlet duct 18 of the spray chamber and an inlet duct 20 of an air pollution control means or scrubber 22. The heat exchanger 16 may likewise be of conventional construction and, as will presently be explained in greater detail, includes a second passageway likewise depicted by dashed lines, in intimate thermal contact with the first passageway to provide a transfer of heat energy between the gases flowing in the respective passageways such as to effect a cooling of the gases in the first passageway and a heating of the gases in the second passageway.

The scrubber means 22, which preferably is constituted in two stages as denoted by the dashed line dividing the block 22, sprays or otherwise brings a scrubbing fluid such as water into intimate contact with the combustion gases in order to collect and remove the fly ash, soot and other objectionable particulate matter carried by the gases. The construction and operation of such scrubber units is well understood to those skilled in the art and therefore need not be explained in detail herein. In accordance with the present invention, however, the second stage of the scrubber 22 is further adapted to pass relatively cool water through the combustion gases in a predetermined substantial quantity in order to reduce the temperature of the combustion gases substantially below their dew point thereby causing condensation of the moisture vapor carried thereby and permitting recovery of substantially all of the water absorbed by the gases in the spray chamber and first stage of the scrubber 22.

Since relatively large quantities of water are required in processing of the combustion gases within the scrubber 22, it is preferable from an economic standpoint to recover, suitably process and reuse this water. To this end, the present system includes individual water recirculation apparatus for each scrubber stage, as generally denoted within the dashed outline 24. More specifically, a water clarifier 25 is coupled to a drain or water recovery conduit 26 of the first stage of the scrubber 22. The water clarifier 25 may be of conventional design and include, for example, a settling tank or the like. A pump 28 is connected to the outlet of the clarifier 25 to return the cooled and clarified water to the scrubber as well as to draw such additional make-up water as may be needed from a common water supply inlet 32 to replace that lost from the system.

Similarly, a clarifier 34 and a pump 36 are connected to recirculate the water for the second scrubber stage with the common water supply conduit 32 being connected to the inlet side of the pump 36. Assuming that the clarifier 34 does not provide adequate water cooling, its outlet may be coupled to a heat exchanger 35 for further cooling the clarified water to the temperature suitable for reintroduction into the second stage of the scrubber 22.

The cool, scrubbed and dehydrated combustion gases at the outlet of the scrubber 22 are drawn along a conduit 38 and through the second passageway of the heat exchanger 16 by an induced draft fan 40. The combustion gases are reheated by movement through the heat exchanger 16 by virtue of the thermal contact with the hot combustion gases passing through the first passageway of the heat exchanger. The reheated combustion gases exiting from the heat exchanger are discharged to the atmosphere through the conventional chimney or stack 42 absent objectionable contaminants and without a visible steam plume.

Figure 2:
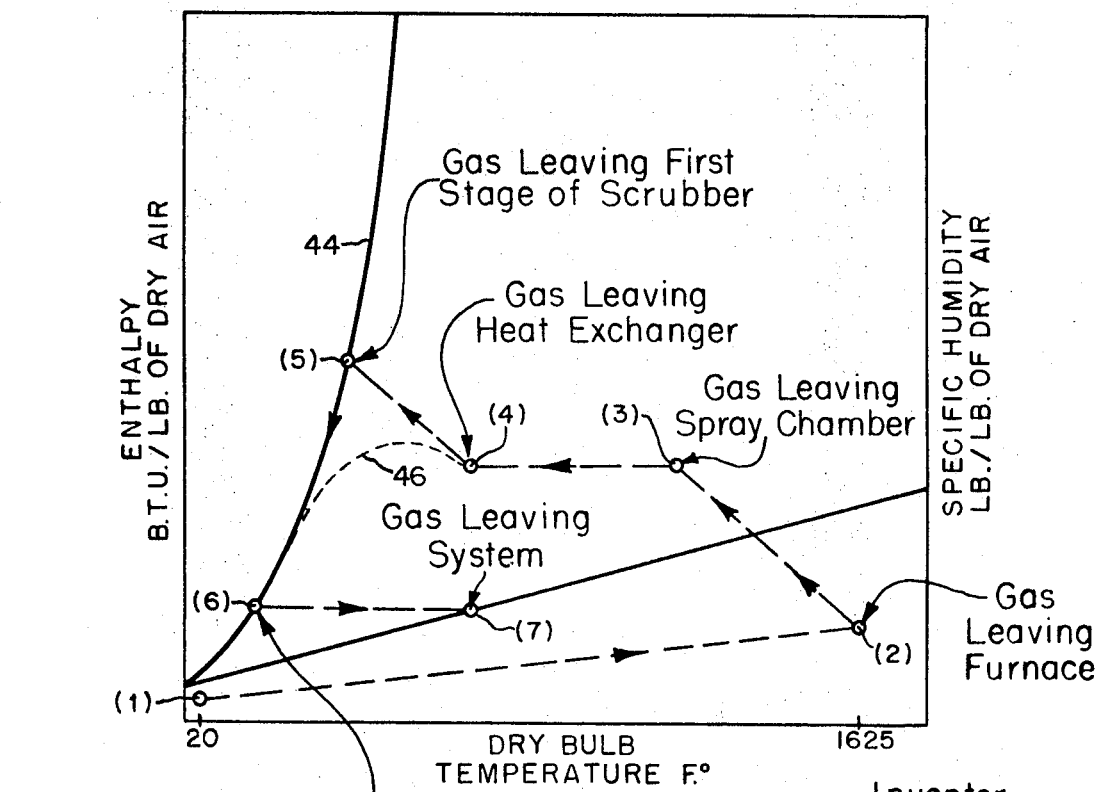
FIG. 2 is a psychrometric chart useful in understanding the operation of the system of FIG. 1 and depicting the thermodynamic state points of the gases at the several stages in the system.

The operation of the system of FIG. 1 may best be understood by consideration of the psychrometric chart of FIG. 2 which illustrates the thermodynamic state points of the gases at the various stages in the system under exemplary system operating conditions. The psychrometric chart is in conventional form plotting dry bulb temperatures in degrees Fahrenheit along the abscissa versus enthalpy or specific humidity along the ordinate of the graph. Specifically, ambient air at an assumed temperature of 20 degrees Fahrenheit and denoted by the state point (1) on the chart is introduced into the furnace incident to the combustion process and exits through the conduit 12 as a constituent of the intensely hot combustion gases at an assumed temperature of 1625 degrees Fahrenheit, as denoted by the state point (2) on the chart. The gases at the state point (2) are of a higher humidity than the ambient air due to the production of water vapor as a by-product of the combustion process, etc., as discussed earlier herein. The combustion gases are next cooled in the spray chamber 14 along an assumed constant wet-bulb temperature line of 174 degrees Fahrenheit to a temperature at the state point (3) of approximately 1,000 degrees Fahrenheit which gas temperature is sufficiently low so as not to cause damage to the heat exchanger 16. It is also to be noted that the humidity of the gases is increased significantly by contact with the water sprays in the chamber 14.

The heat exchanger 16, as earlier stated, includes first and second passageways in intimate thermal contact, the first passageways carrying the relatively hot combustion gases to the scrubber 22 and the second passageway conveying the cooled combustion gases to the stack 42. This intimate thermal contact between the respective passageways results in a further cooling of the relatively hot combustion gases along a line of constant humidity to a temperature of approximately 600 degrees Fahrenheit as denoted by the horizontal line interconnecting the state points (3) and (4). In conformity with basic principles of thermodynamics, the heat energy lost by the gases flowing through the first passageway is gained by the gases in the second passageway (ignoring the state points (6) and (7) which line is approximately equal in length to that connecting the state points (3) and (4).

It is assumed for simplicity and clarity of explanation that the scrubber means 22 consists of two stages and that the first stage effects, incident to scrubbing or cleansing the gases, a cooling of these gases to a saturation condition at a temperature of a bout 175 degrees Fahrenheit as denoted by the constant wet-bulb temperature line interconnecting the state points (4) and (5). As shown, the state point (5) lies on the solid line saturation curve 44. The saturation curve 44, of course, represents the locus of points defining the maximum quantity of moisture that the gases are able to contain at each dry bulb temperature value; a further cooling of the saturated gases results in a condensation of the water vapor carried thereby.

In view of the fact that the gases leave the first scrubber stage in a saturated condition, the gases in the second stage are therefore confined to follow the contour of the saturation curve during their transition between the saturation state points (5) and (6). As previously stated, the the water systems for the first and second stages of the scrubber are separate each with its own pumping and clarification means as required. Depending on the manner of the process and the resulting economic advantages, the cooling and humidification process occurring in the first stage of the scrubber and the dehumidification and cooling process occurring in the second stage of the scrubber may be combined in a single scrubber unit. It will be recognized by those skilled in the art that under more general conditions as, for example, where the treatment of the gases occurs in a single scrubber stage, the transition of the gases between the state points (4) and (6) will be of a more complex or generalized nature, perhaps approximately the dotted line curve 46. At any rate, under the assumed conditions the gases entering the first stage of the scrubber are cooled by the influence of the water spray while the spray concurrently collects and removes the particulate matter suspended in the gases. The gases also absorb a predetermined amount of the water causing them to approach a saturation condition at the state point (5). The continued scrubbing and cooling of the gases in the second stage of the scrubber unit 22 results in condensation of the moisture carried by the saturated gases thereby effectively dehydrating the gases. This cooling is continued until the gases reach a temperature of approximately 110 degrees Fahrenheit at which time substantially all of the moisture added to the gases between the state points (2) and (5) has been recovered as a condensed liquid. This recovered water is processed for reuse by the water recirculation system 24, as previously explained.

The minimum extent to which the scrubbed combustion gases must now be reheated in order to avoid formation of a steam plume is dependent upon their temperature-humidity condition as denoted by the state point (6) and the temperature-humidity condition of the ambient air.

This minimum gas discharge temperature may reliably be determined from the graph of FIG. 2. Specifically, a steam plume will not be formed as long as the moisture content of the stack gases is of a value lying at or below a line tangent to the saturation curve 44 at a point equal to the dry bulb temperature of the ambient air. In the present example the line 48 is drawn tangent to the saturation curve at an assumed dry bulb ambient temperature of 20 degrees Fahrenheit. The gases are reheated in the heat exchanger 16 to their exit temperature of about 575 degrees Fahrenheit as denoted by the horizontal line of constant humidity connecting the state points (6) and (7).

Since the state point (7) lies at an intercept with the tangent line 48, the cleansed combustion gases are discharged to the atmosphere absent an objectionable steam plume.

While a particular embodiment of the present invention has been shown and described, it is apparent that various changes and modifications may be made, and it is therefore intended in the following claims to cover all such modifications and changes as may fall within the true spirit and scope of this invention.

I claim:

1. The method of removing particulate matter from heated gases and suppressing formation of a steam plume upon discharge of the gases to the atmosphere, said method comprising the steps of:

precooling said gases to predetermined temperature by passing said gases through a first passageway of a heat exchanger;

scrubbing said gases with a fluid for removing particulate matter therefrom;

cooling said gases substantialy below their dew point temperature for effectively dehydrating said gases by condensation of the water vapor carried thereby;

reheating the scrubbed gases by passing said scrubbed gases through a second passageway of said heat exchanger which is in intimate thermal contact with said first passageway so as to raise the temperature of thereof sufficiently to preclude formation of a steam plume upon emission of said scrubbed gases to the atmosphere;

and emitting the reheated gases to the atmosphere.

2. The method of claim 1 in which said cooling of said gases below their dew point is accomplished by continued introduction of a relatively cool scrubbing fluid into the gases.

3. The method of claim 2 and further including the steps of:

recovering the used scrubbing fluid;

clarifying and cooling said used scrubber fluid;

and recirculating the cool and clarified scrubber fluid for reuse in said scrubbing step.

References Cited

UNITED STATES PATENTS

| 2,252,738 | 8/1941 | Stoever | 55—85 X |
| 3,232,027 | 2/1966 | Lorenz et al. | 59—93 X |
| 3,382,649 | 5/1968 | Richmond | 55—84 |

JOHN ADEE, Primary Examiner

U.S. Cl. X.R.

55—93

UNITED STATES PATENT OFFICE
CERTIFICATE OF CORRECTION

Patent No. 3,619,983      Dated November 16, 1971

Inventor(s)    Fred W. Rohr

It is certified that error appears in the above-identified patent and that said Letters Patent are hereby corrected as shown below:

Col. 2, line 2, change :"stem" to --steam--

Col. 4, line 55, change "a bout" to --about--

Col, 5, line 8, change "approximately" to --approximating--

In the Claims:

Col. 6, line 16, change "substantialy" to --substantially--

IN THE CLAIMS:

Col. 6 line 23 insert --said scrubbed gases and reduce the relative humidity-- before "thereof"

Signed and sealed this 27th day of June 1972.

(SEAL)
Attest:

EDWARD M. FLETCHER, JR.       ROBERT GOTTSCHALK
Attesting Officer      Commissioner of Patents